(12) United States Patent
Berg et al.

(10) Patent No.: US 6,178,157 B1
(45) Date of Patent: Jan. 23, 2001

(54) FLYING HEAD WITH ADJUSTABLE ACTUATOR LOAD

(75) Inventors: John S. Berg, Bellingham, MA (US); Neville K. S. Lee, Kowloon (HK)

(73) Assignee: Digital Papyrus Corporation, Sunnyvale, CA (US)

(*) Notice: Under 35 U.S.C. 154(b), the term of this patent shall be extended for 0 days.

(21) Appl. No.: 08/804,301

(22) Filed: Feb. 21, 1997

Related U.S. Application Data

(60) Provisional application No. 60/015,493, filed on Apr. 15, 1996.

(51) Int. Cl.$^7$ .................. G11B 5/60; G11B 11/18
(52) U.S. Cl. .................. 369/300; 360/294.7
(58) Field of Search .................. 360/75, 102, 103, 360/104, 106, 109, 114, 294.7, 234.7, 234.3, 234.4; 369/300, 13, 110, 112

(56) References Cited

U.S. PATENT DOCUMENTS

| | | | |
|---|---|---|---|
| 3,713,130 | 1/1973 | Armer | 340/267 R |
| 3,863,124 * | 1/1975 | Pierce et al. | 318/638 |
| 3,894,180 | 7/1975 | Canino | 178/6.6 R |
| 4,003,059 | 1/1977 | Sugiura et al. | 346/108 |
| 4,146,911 * | 3/1979 | Gyi et al. | 360/75 |
| 4,286,298 * | 8/1981 | Rinkleib | 360/109 |
| 4,605,977 | 8/1986 | Matthews | 360/103 |
| 4,651,242 * | 3/1987 | Hirano et al. | 360/103 |
| 4,814,907 | 3/1989 | Goor | 360/75 |
| 4,814,908 | 3/1989 | Schmitz | 360/77.02 |
| 4,843,502 | 6/1989 | Tagawa | 360/105 |
| 4,853,810 * | 8/1989 | Pol et al. | 360/103 |
| 5,082,827 | 1/1992 | Barnes | 505/1 |
| 5,111,348 | 5/1992 | Baba | 360/77.06 |
| 5,148,415 * | 9/1992 | Takeuchi | 369/13 |
| 5,189,578 | 2/1993 | Mori et al. | 360/106 |
| 5,247,493 * | 9/1993 | Kime et al. | 369/13 |
| 5,255,135 | 10/1993 | Itoh et al. | 360/75 |
| 5,276,573 * | 1/1994 | Harada et al. | 360/103 |
| 5,371,939 | 12/1994 | Ressmeyer et al. | 29/603 |
| 5,377,058 * | 12/1994 | Good et al. | 360/75 |
| 5,392,173 | 2/1995 | Kinoshita et al. | 360/75 |
| 5,502,565 | 3/1996 | Fukuzawa et al. | 356/357 |

FOREIGN PATENT DOCUMENTS

| | | |
|---|---|---|
| 0 153 793 A1 | 9/1985 | (EP) . |
| 0 242 597 A2 | 10/1987 | (EP) . |
| 0 409 468 A2 | 1/1991 | (EP) . |
| 0 470 807 A1 | 2/1992 | (EP) . |
| 02 179 933 | 7/1990 | (JP) . |
| 02210660 | 8/1990 | (JP) . |
| 3-214480 * | 9/1991 | (JP) . |
| 04121884 | 4/1992 | (JP) . |
| 5-174524 | 7/1993 | (JP) . |
| 6-180871 * | 6/1994 | (JP) . |
| 07 311 945 | 11/1995 | (JP) . |
| 247362 | 11/1995 | (TW) . |

\* cited by examiner

Primary Examiner—William Klimowicz
(74) Attorney, Agent, or Firm—Wolf, Greenfield & Sacks, P.C.

(57) ABSTRACT

A flying head mechanism includes a flying head, a suspension and an actuator which applies a load force through the suspension. The load force applied by the actuator is adjustable while the head is in operation. The actuator may actively control load force as part of a feedback loop which maintains the flying head at a constant flying height. One embodiment disclosed includes a voice coil actuator. In embodiments using an optical flying head, a conventional focus sensor may provide a signal indicative of flying height, since the focus signal inherently indicates flying height error.

32 Claims, 8 Drawing Sheets

FLYING HEAD WITH ADJUSTABLE ACTUATOR LOAD

This application claims the benefit of provisional application Ser. No. 60/015,493 filed Apr. 15, 1996.

FIELD OF THE INVENTION

The present invention relates generally to suspension systems for flying disk drive heads. More particularly, the invention relates to suspension systems for flying disk drive heads in which the head is caused to fly at a minimum glide height by adjusting the load force applied to the head in a direction normal to the disk surface while the disk drive is engaged in normal operation.

BACKGROUND OF THE INVENTION

High density disk drive systems based on magnetic, magneto-optic and optical storage principles generally use a transducer system which does not, under normal operating conditions, contact the surface of the recording medium. Such non-contact transducers are known in this art as flying heads because of the principles upon which they rely to maintain a correct position with respect to the surface of the recording medium.

A brief description of how a flying head flies is now given, with reference to FIG. 15.

During operation of a disk drive, the recording medium, typically in the form of a specially coated disk of aluminum, glass or plastic, rotates at high speeds, e.g., 3600 RPM. The rotary motion of the disk 107 causes an air flow in the direction of rotation, near the surface 106 of the disk 107. The head 101 is placed by a mechanical actuator or load arm 103 in proximity with the surface 106 of the disk so that the air flow passes between the surface of the disk and the lower features of the head, thereby forming a cushion of air 108 which generates an upwards force $F_A$ on the head 101 due to air pressure in the space between the disk surface and the lower features of the head 101, with the lower features of the head defining an air bearing surface 110. The cushion of air 108 that develops between the air bearing surface 110 and the surface 106 of the disk is referred to hereinafter as an air bearing.

The flying head 101 flies at a flying height 113, defined herein as the separation distance between the air bearing surface 110 of the head 101 and the surface 106 of the disk, determined by the force balance between the air pressure $F_A$ of the air bearing 108 pushing the head 101 away from the surface 106 of the disk, and a downward force $F_L$ exerted through a spring 105 or suspension that mounts the head 101 to the load arm or actuator 103.

The force $F_L$ has a magnitude determined by the physical dimensions of the spring, the spring constant of the spring material and the deformation of the spring which occurs in operation. The upward force $F_A$ applied by the air bearing depends on the finish of the disk surface, the linear velocity of the disk surface where it passes under the head, and the shape and size of the air bearing surface of the head. Whenever $F_A$ and $F_L$ are not equal, the head experiences a net force which causes it to move in a vertical direction corresponding to the direction of the net force. When $F_L=F_A$ the head experiences no net force, and hence no vertical motion.

In conventional systems, as flying height 113 increases, the air bearing 108 grows, lowering $F_A$, while spring 105 is compressed, raising $F_L$. The relationship between each of the forces $F_L$ and $F_A$ and flying height 113 can be determined by application of aerodynamic principles to the system configuration, which can be done by making measurements on actual systems, or physical or computer-generated models of the system. The conventional system is designed so that $F_L=F_A$ at the desired flying height when the disk 107 is spinning at its normal speed. When the disk spins down, i.e., slows to a stop, insufficient air flow occurs to maintain the air bearing between head and disk. Hence, insufficient air pressure and force are generated to counteract the downward force exerted by the spring or suspension, leading to contact between head and disk. Thus, when the disk 107 slows to a stop, the head 101 may come to rest on the disk surface 106. Alternatively, the disk drive may include a mechanism that lifts the suspension 103 to prevent contact between the head and the disk when the disk spins down, but otherwise plays no role in normal disk drive operation.

Flying height 113 is one important parameter governing successful operation of a disk drive. At extremely large values for flying height 113, excessive distance from the disk can cause unacceptable functional performance, for example, an inability to discriminate high frequency signals. Close proximity of the head to the disk improves functional performance. However, at extremely small values for flying height 113, insufficient flying height or loss of separation between the head and the disk can result in aerodynamic instability, reliability problems and catastrophic product failure, e.g., a head crash which occurs when the head contacts the disk surface with sufficient force to cause damage to the head or the disk surface resulting in a loss of data. Avoiding potential damage often associated with contact between head and disk is the reason that some disk drives move their heads away from the disk surface to avoid contact when the disk spins down. The lowest height at which the head can fly without making contact with the disk surface is defined as the minimum glide height for the disk. Asperities, (i.e., microscopic bumps or roughness) in the disk surface are those features which are likely to be contacted first by the head.

One problem of disk drive manufacturing is that the physical parameters determinative of flying height. e.g., the spring characteristics (affecting load force), the design of the air bearing surface shape, manufacturing variations in the air bearing surface geometry and finish (affecting air bearing force), and the load arm position relative to the surface of the disk (affecting load force), exhibit some variation within a tolerance band which causes a corresponding variation in the load force or air bearing force and, in turn, flying height. Other sources of variation in flying height in a disk drive include variations in altitude (i.e., ambient air density), radial position of the head on the disk which varies the velocity of the air flow due to different track circumferential lengths at different track radii, and skew angle of the head relative to a line tangential to a track, all of which affect the air bearing force.

Conventionally, flying height is set by a mechanical adjustment made at the time of manufacture of a disk drive. The mechanical adjustment sets a static load force selected to provide a desired flying height under nominal conditions. For example, the static load force may be measured manually and adjusted by repositioning or bending the load arm 103. Once set, the static load force remains substantially unaltered for the life of the disk drive, despite variations in operating conditions which may cause variation in other parameters determinative of flying height. Conventional systems are also known which employ closed loop feedback control systems to maintain a substantially constant flying height. Although such systems can compensate for variations in some parameters, there remain other uncompensated tolerance errors, such as variation in the actual minimum glide height from one disk to another.

Thus, flying height in conventional disk drives cannot be set to the minimum glide height. Rather, tolerance variations such as discussed above must be considered, adding a tolerance band to the nominal or design minimum glide height of a disk when setting the actual flying height. Therefore, in order to avoid any likelihood of unwanted contact between the head and the surface of the disk, conventional systems set a nominal flying height that is greater than the largest expected actual minimum glide height.

SUMMARY OF THE INVENTION

The present invention provides an improved method and apparatus for controlling the flying height of a flying disk drive head.

According to one aspect of the invention, there is provided a flying head mechanism having a controllable load force, for use with a recording medium. The mechanism includes a head having an air bearing surface, the head being mounted by a suspension such that relative motion between a surface of the recording medium and the air bearing surface will cause an air bearing to develop therebetween. A force actuator is connected to the suspension, to apply an adjustable load force to the head through the suspension in opposition to a separating force generated by the air bearing. The force actuator has a control input to receive a control signal and acts responsive to the control signal to adjust the load force. A controller has a control output connected to the control input of the force actuator, that carries the control signal, the controller operating the control signal to cause the actuator to produce a load force which acts to substantially maintain the head at the minimum glide height above the surface of the recording medium.

A flying head mechanism having a controllable load force, for use with a recording medium, according to another aspect of the invention includes a head having an air bearing surface oriented relative to a surface of the recording medium such that relative motion between the air bearing surface and the recording medium surface causes an air bearing to develop therebetween. Also provided is a load force controller, coupled to the head, to apply a load force in opposition to a separating force generated on the head by the air bearing, the load force controller including a sensor to measure flying height and minimum glide height of the head, the load force controller being configured to vary the load force to maintain a constant separation substantially equal to the minimum glide height between the air bearing surface and the recording medium surface.

The present invention may also be embodied in a method of controlling a load force applied to a flying head while using the flying head to reproduce information recorded on a recording medium. The method includes the following steps. Measure a flying height of the head above an information track of the recording medium. Determine whether the measured flying height is equal to a minimum glide height for the recording medium. Adjust the load force applied to the head when the measured flying height is found unequal to the minimum glide height in the step of determining. Simultaneously with the foregoing steps, reproduce information recorded on the recording medium using the flying head.

Another method of loading a flying head on a medium according to an aspect of the invention includes the following steps. Apply a load force to the head. Vary the load force in response to varying operating conditions to maintain a substantially constant flying height at a minimum glide height for the medium while the head retrieves information from the medium.

A flying head mechanism according to yet another aspect of the invention simply includes a flying head; a sensor that detects a flying height of the head relative to a minimum glide height; and means for applying a load force to the head that varies in accordance with the detected flying height to maintain the flying height of the head substantially at the minimum glide height.

BRIEF DESCRIPTION OF THE DRAWINGS

In the Figures in which like reference designations indicate like elements.

DETAILED DESCRIPTION

The present invention will be better understood upon reading the following detailed description of various illustrative embodiments of the invention, in connection with the figures.

Embodiments of the present invention maintain a flying head at a flying height substantially equal to the minimum glide height for each data track of the disk over which the head is flown, despite variation in the minimum glide height from the nominal or design minimum glide height, or variation in other parameters affecting flying height. In one embodiment of the invention, this is done by measuring the minimum glide height while accessing data. In the illustrative embodiments of the invention described below, the measurement is made by detecting whether, and with what frequency, the flying head contacts surface asperities of the disk. The flying head is lowered toward the surface of the disk to a point where a low incidence of contact with surface asperities is detected, that point being just below the minimum glide height as defined above. The flying height of the head is then controlled to maintain the head just out of range of such contacts, i.e., at the minimum glide height.

In one embodiment described below, in which a feedback control system controls flying height, vertical runout of the disk is measured and stored. The stored vertical runout information is then used to bias a control signal of the feedback control system so that the system is not required to correct for flying height errors as large as would be present without biasing the control signal.

The present invention adjusts $F_L$ during normal operation of the head and disk. That is, the present invention adjusts $F_L$ even while the head may be reading information from the disk or writing information to the disk during operation of the disk drive as a component of a computer system. A system according to some embodiments of the invention may control flying height using a closed loop control architecture that, for example, makes adjustments to $F_L$. By controlling $F_L$ even during operation of the head and disk, embodiments of the present invention can adjust $F_L$ to compensate for known or measured variations in $F_A$ or other parameters that vary during such operation. For example, in one embodiment of the invention, as atmospheric pressure slowly changes over time during operation of the disk drive, flying height is controlled by automatically adjusting $F_L$ to compensate for changes in $F_A$ caused by the variation in atmospheric pressure.

Embodiments of the present invention can control flying height to maintain the head at the minimum glide height for the disk, in contrast to conventional load-setting mechanisms which fly the head above the minimum glide height to accommodate tolerancing errors. Maintaining the head at the minimum glide height, without hitting asperities, ensures that reliability remains high, while signal strength is maximized.

Figure 1:
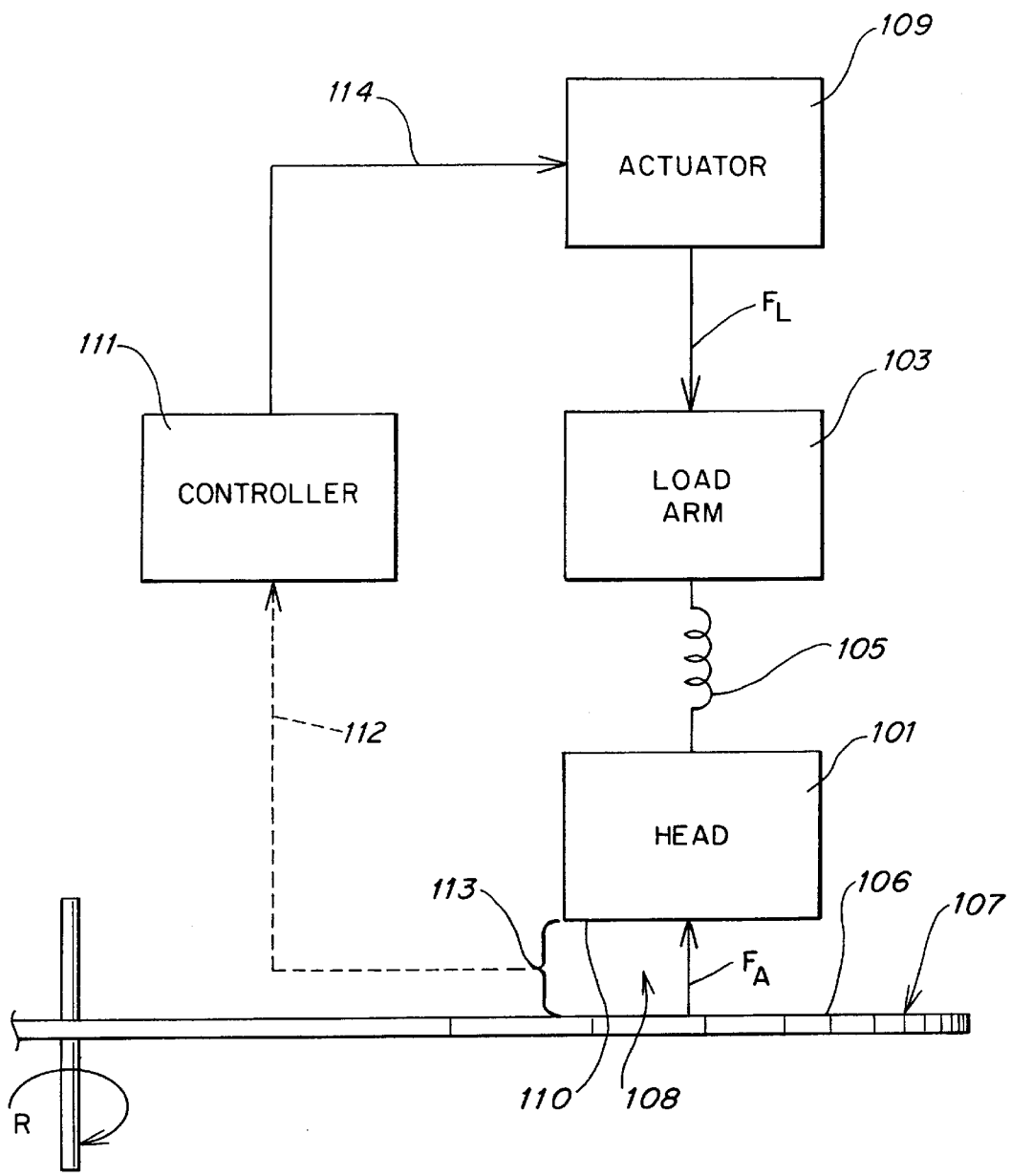
FIG. 1 is a schematic block diagram of a feedback controlled flying head load mechanism illustrating aspects of the present invention.

The schematic drawing of FIG. 1 is now referred to in connection with a general description of one embodiment of the invention. As illustrated by the figure, a flying head 101 is resiliently mounted in a conventional manner to load arm 103 by a resilient member 105 which may be a spring, elastomer or other flexible element. Load arm 103 can be positioned by a positioner mechanism (not shown) to maintain head 101 in close proximity to disk 107. Disk 107 is rotated at high speed, generating an air bearing 108 between air bearing surface 110 and disk surface 106 that produces an upward force $F_A$ upon head 101. The upward force $F_A$ is balanced by a downward load force $F_L$ generated by actuator 109, and acting on the head 101 through load arm 103 and resilient member 105. This embodiment of the invention further includes a feedback path including a controller 111 having an input which receives a signal 112 indicative of the flying height 113 of the head 101 over the disk 107, and in particular of how close the head 101 is flying relative to the minimum glide height. As will be seen below, there are many different ways in which signal 112 can be generated to indicate the flying height 113 of the head 101 over the disk 107 and whether the flying height has fallen below the minimum glide height. For example, as described below in connection with FIG. 8, piezoelectric sensors can be built into the head 101 to detect asperities or bumps on the disk 107. Detecting any asperities indicates the head 101 is too low. Alternatively, the data signal read by the head from the disk 107 can be examined for an indication, such as amplitude, high frequency resolution, or an optical signal focus, that the head 101 is too high or too low. The data signal can also be examined for an indication of contact with surface asperities, such as the presence of a ringing at a natural frequency of the head. The controller 111 produces a control signal output 114 that represents either a force or position command. The controller 111 may be general purpose data processor, special purpose digital signal processing circuits and software, or analog control circuits, for a special purpose digital signal processing circuits and software or analog control circuits, for example. The control signal output 114 of controller 111 is applied to actuator 109 which adjusts the load force $F_L$ in response to the signal 114 to correspondingly adjust the flying height. The actuator 109 can, for example, be a voice coil actuator that produces a force $F_L$ proportional to the control signal.

In the embodiment shown in FIG. 1, the flying head is a damped spring-mass system. The resilient member 105 and the air bearing 108 act as springs suspending the head 101 between the surface of the disk 107 and the load arm 103. The resilient member 105 acts as a spring because of its resiliency. The air bearing 108 acts as a spring because the air itself is a compressible fluid whose pressure varies with the amount of compression.

Damping is an inherent property of both resilient member 105 and air bearing 108, neither of which are perfect springs. The damped spring-mass system enables the flying head to follow rapid (i.e., high frequency) vertical variations in the surface of the disk 107 without imparting vertical motion to load arm 103, much as an automobile suspension enables the tires to follow bumps in the road without imparting vertical motion to the passenger compartment. It should be understood that vertical variations in disk 107 cause variations in $F_A$ which result in variations in flying height. In this art, vertical variations in the surface 106 of the disk 107, whether rapid or not, are called vertical runout. The mass of the head 101 affects the ability of the head 101 to respond to variations in the surface 106 of the disk 107 because greater suspended mass slows the reaction time of the head 101 to variations in the surface 106 of the disk 107, a well-known property of damped spring-mass systems. Therefore, minimizing the mass of the head 101 that moves to follow disk surface variations increases the frequency response of the system (i.e., the ability of the system to follow high frequency surface variations). In addition, increasing the spring constant of the air bearing, i.e., making the air bearing less compressible, for example by changing the geometry of the air bearing surface as is known in this art, also increases frequency response by increasing the mechanical coupling between the disk surface and the head through the air bearing. The resilient member 105, one of whose functions is to permit movement of the head in response to vertical runout, therefore is arranged to permit the head 101 to move vertically by a distance which should be greater than the amplitude of the high frequency component of the vertical runout of the disk. With this condition met, the head 101 responds to the high frequency variations in the surface 106 of the disk 107 and maintains a safe functional flying height.

The high frequency variations in the surface 106 of disk 107 often cause a complex combination of roll, pitch, yaw and radially directed forces on the head 101. As in conventional systems, embodiments of the invention address these complex forces using a gimbal arrangement, as follows. It should be understood that the disclosed gimbal arrangements are not to be considered limiting, as other conventional gimbal arrangements can also suit this purpose. In one embodiment of the invention, the resilient member 105 is arranged to serve as a gimbal to allow some roll and pitch motion of head 101 while preventing motion in undesirable directions. Radial motion and yaw motion is undesirable because they cause mispositioning of the head which hinders data reading and writing operations. However, vertical roll and pitch motions of the head desirably permit the head to follow variations in the surface of the disk without making contact therewith. Therefore, in one embodiment of the invention, the effective spring constant of the resilient member 105 is extremely high in radial and yaw directions, and lower in vertical, roll and pitch directions.

Several illustrative embodiments of gimballed resilient members 105 for use in connection with the present invention are discussed later in connection with FIGS. 9–14. Although the illustrated gimbals have been found to be advantageous, the invention is not limited to these particular arrangements. Rather, there are many suitable conventional gimbal arrangements that could be used in association with the present invention.

The system described generally above is now described in further detail with respect to an embodiment of a flying head system having a controllable load force. The inventive system has an active suspension, in which load force may be dynamically adjusted during use, as compared to a conventional passive suspension that uses a simple damped spring-mass system in which load force is set mechanically. In the illustrative embodiment described, the head is an optical disk drive head. However, it should be understood that the invention is not limited in this respect, and that the disk drive head can be any type of flying head, including but not limited to magnetic and magneto-optic heads.

Figure 2:
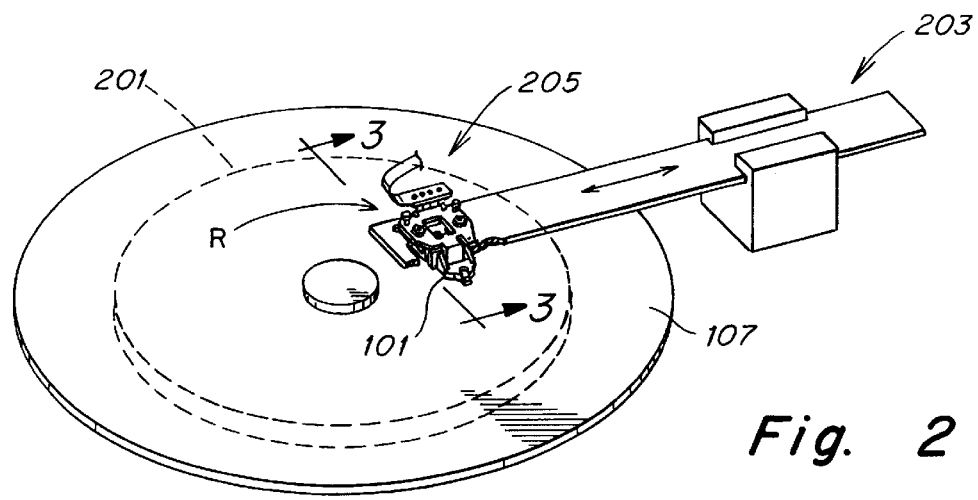
FIG. 2 is a perspective view of a disk drive using a mechanism embodying aspects of the invention.

A simplified perspective view of the elements of an optical disk drive system with which the present invention can be used is shown in FIG. 2. In this simplified view, disk 107 is rotated in direction R by motor 201. A head positioning mechanism 203 radially positions the head 101 at a radius of the disk 107 sought to be read or written to. Each radius of the disk 107 sought to be read or written to is referred to herein as a track. Such radial positioning is referred to as seeking or as motion in a seek direction. The head 101 is connected to the positioning system 203 through an active suspension mechanism 205 that includes load arm 103, gimbal 105 and several additional components shown in greater detail in FIGS. 3–7.

Figure 3:
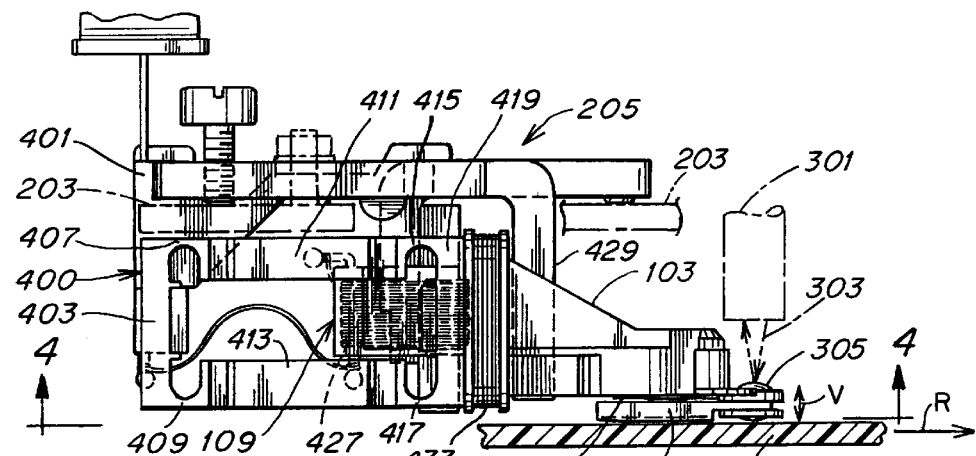
FIG. 3 is a side elevation view of a head suspension used in the disk drive taken along line 3—3 of FIG. 2.
Figure 4:
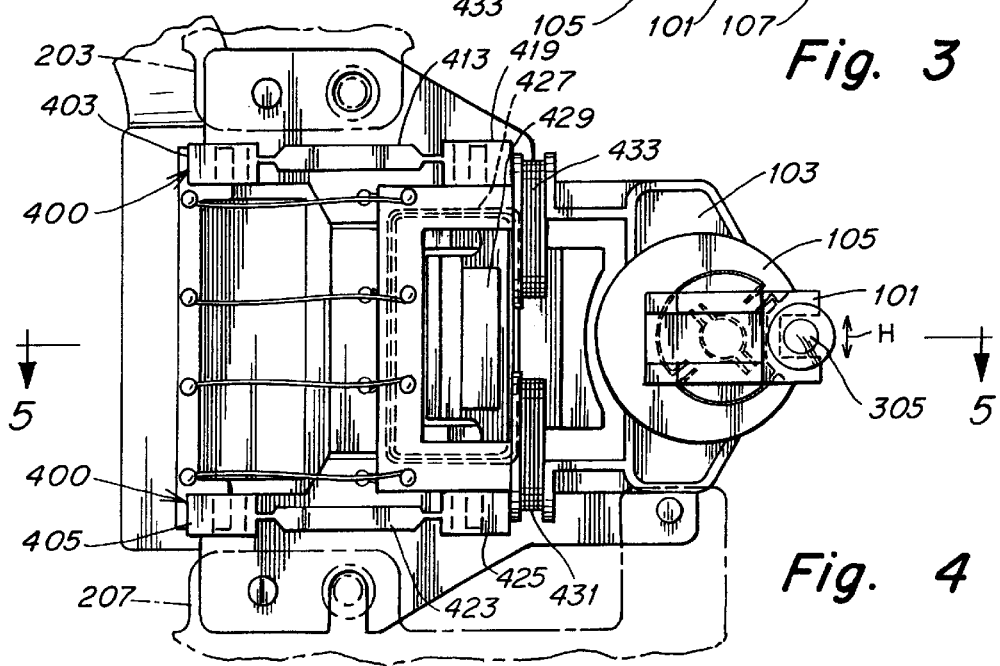
FIG. 4 is a bottom plan view of the head suspension taken along line 44 of FIG. 3.

Referring to FIGS. 3 and 4, the rotary motion of disk 107 causes disk 107 to move past the head 101 in the direction R as shown. The head 101 is attached by a resilient member 105, such as described above, to a load arm 103. Load arm 103 is integrated with an actuator mechanism, generally indicated at 109. Finally, the combined load arm 103 and actuator 109 that carry head 101 are mounted to the positioning system 203. In the case of the illustrated optical embodiment, a laser light source 301 shines a laser beam 303 through a lens 305 which is part of head 101.

Figure 6:
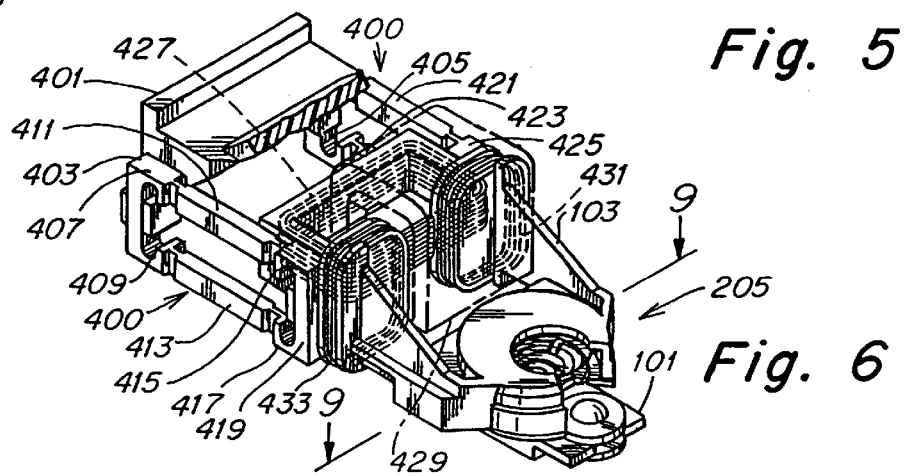
FIG. 6 is a perspective view of the head suspension of FIGS. 2–5.

Conventionally, the load arm would be fixedly mounted to the positioning member 203 so that except for the head responding to vertical runout of the disk surface 106 via the resilient member 105 as described above, only positioning system 203 would move the head 101. However, in this embodiment of the invention, the actuator mechanism 109 produces additional motion in two directions independent of the response of the head 101 to vertical runout of the disk surface 106, and independent of any movements produced by positioning mechanism 203. According to this embodiment of the invention, the actuator includes a vertically oriented voice coil 427 that produces vertical motion by acting on steel member 429. The actuator further includes transversely mounted voice coils 431 and 433 that produce an independent horizontal motion H in the seek direction, also by acting on steel member 429. In other embodiments, any one or more of voice coils 427, 431 and 433 can be replaced by a different source of motive force, such as a piezoelectric element. Servo control of horizontal motion H is used to microposition head 101 over a track after seeking of positioning system 203 is complete. Movable mounts 400 connect the actuator components 109 and load arm 103 to a rigid frame 401 (FIG. 6). The rigid frame 401 is attached to the positioning mechanism 203 so that the entire suspension mechanism (FIG. 2, 205) can be quickly positioned in a desired radial location (i.e., within the micropositioning capability of the actuator mechanism 109 of a desired track) relative to the disk 107.

Figure 7:
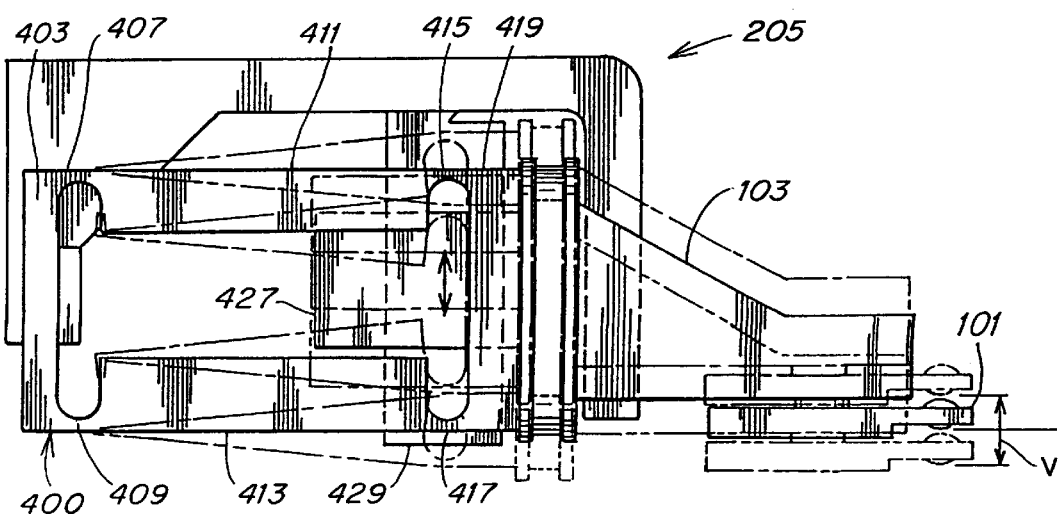
FIG. 7 is a side elevation view showing the movement of the head suspension of FIGS. 2–5.

The actuator 109 of FIGS. 3–4 and its connection to the positioning system 203 through movable mounts 400 is now described in more detail in connection with FIGS. 5–7. Suspension 205 includes a frame 401 which is rigidly connected to the positioning system 203. A pair of rigid members 403 and 405, elongated in a vertical direction, is affixed to the frame 401. At the ends of rigid member 403 are hinged supports 407 and 409, oriented for flexing in a vertical direction. Hinged supports 407 and 409 do not permit substantially any flexure in a horizontal direction. Hinged supports 407 and 409 attach swing arms 411 and 413 to rigid member 403. When at rest swing arms 411 and 413 extend perpendicular to member 403 and substantially parallel to each other for equal distances to hinges 415 and 417, which are in turn connected to a second vertically oriented member 419. Similarly, vertical member 405 is connected through swing arms 421 and 423 to a second vertical member 425. Actuator 109 includes a voice coil 427 acting upon a steel member 429 rigidly connected to frame 401 to vertically displace vertical members 419 and 425. Load arm 103 is rigidly attached to vertical members 419 and 425.

The movable mounts 400 can be formed of a resilient plastic material or another resilient material. Thus, the flexible hinged supports act as spring elements which contribute to the ability of the head 101 to follow vertical runout of the disk surface 106.

Figure 5:
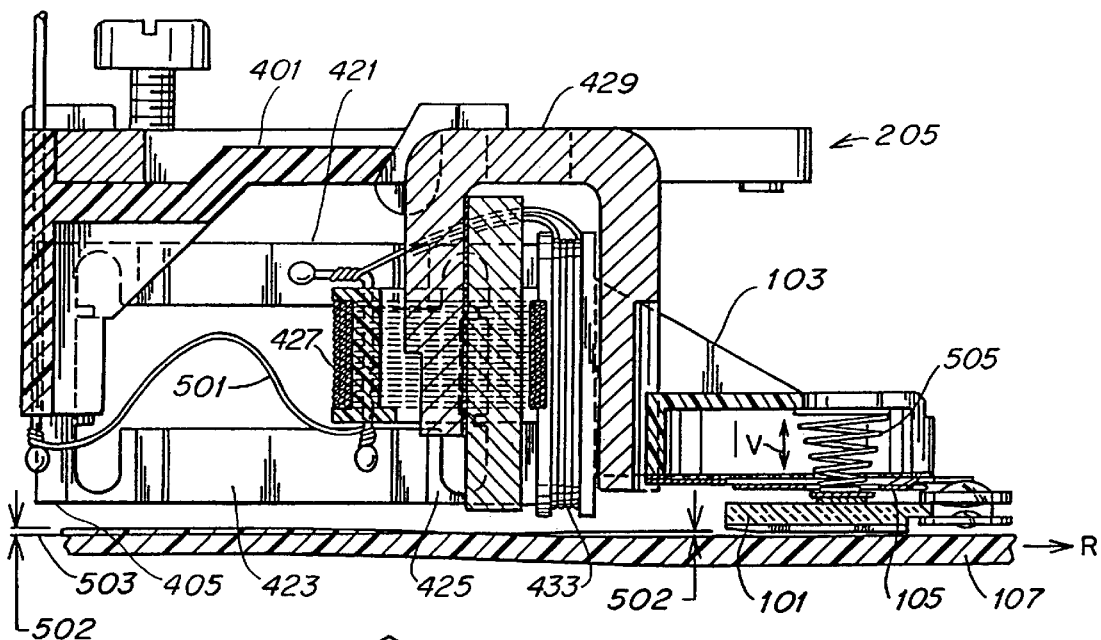
FIG. 5 is a cross-sectional view of the head suspension taken along line 5—5 of FIG. 4.

Referring specifically to FIG. 5, electrical currents applied to input wires 501 of the voice coil 427 produce up and down displacements of the voice coil 427, as indicated by double-headed arrow V, relative to frame 401. Thus, the load arm 103 and head 101 are also displaced relative to frame 401 as indicated by arrow V. As seen in FIG. 5, disk 107 may include surface perturbations 502 from a nominally flat surface 503. Perturbations 502 are slow variations, relative to the asperities discussed above. Disk motion in direction R causes head 101 to fly a small distance above disk 107. When the vertical runout of the disk 107 causes the surface of the disk 106 to move towards the head 101, the air bearing force $F_A$ increases, forcing the head upward. The head deforms the resilient member 105 as indicated by arrow V. Resilient member 105 and spring 505, when provided, are deformed by the movement of the head 101, as indicated by arrow V, until the force applied by deformable member 105 is equal to and opposite the air bearing force $F_A$. The stiffness of resilient member 105 can be set by the choice of materials and configuration of deformable member 105, and can be supplemented by providing the assistance of spring 505. The configurations described are merely illustrative, and the invention is not limited to anyone of these.

In one embodiment of the invention, actuator 109 is included as part of a closed loop feedback system capable of following at least low frequency vertical runout of the surface 106 of disk 107. When part of a closed loop feedback system as described above in connection with FIG. 1, actuator 109 can produce variations in load force to displace the head 101 and cause the head to follow corresponding low frequency displacements 502 in the disk surface 107 from the nominally flat condition 503, while deformation of the deformable member 105 as described above permits the head 101 to follow high frequency displacements 502 in the disk surface 107.

As previously described in connection with FIG. 1, a signal 112 representative of flying height 113 is processed by a controller 111 to produce the input signal 114 to the actuator 109. When using the embodiment of FIGS. 3–7, the controller 111 produces a signal 114 applied to the voice coil input through wires 501. The signal 114 applied depends upon the signal 112 representative of the flying height 113. For example, in one illustrative embodiment, the value of the signal representative of the flying height is compared to a set point value indicative of the desired flying height. The difference between the set point value and the value of the signal 112 is used to generate the signal 116. The load force applied by actuator 109 is set by the application of electrical currents, i.e., signal 116, to input wires 501 of the voice coil 427.

The signal 112 representative of flying height 113 may be derived in any of several ways. In the illustrative embodiment of an optical disk drive system discussed in connection with FIG. 3, flying height can be determined from characteristics of the laser beam 303, using a detector to detect the beam after it is directed from the source 301, through the lens 305 of the head 101, to the disk surface and then returned to a detector which can, for example, be co-located with source 301. For example, a laser beam focus signal and read signal amplitude can provide information concerning flying height. Derivation of flying height information from a laser beam focus signal is described below. It is also known that read signal amplitude varies with flying height.

In an illustrative embodiment of the invention in an optical disk drive including a head carrying a solid immersion lens (SIL), a laser focus signal is used to provide the signal 112 representative of flying height. The use of the laser focus signal is advantageous because optical disk drives typically include a focus sensor that, along with its other functions, inherently generates a signal from which flying height of the optical head can be determined. Without any loss of generality, and without limiting the invention to the described embodiment, for the purposes of simplification, the following describes the use of focus signals with SIL heads having a lens with a fixed focal length. In such a lens, an out-of-focus condition is created by improper flying height. Examples of focus sensor systems which are common in optical disk drive applications include Foucault knife-edge sensors, half-aperture focus sensors, and astigmatic sensors employing quad detectors, all known to those skilled in this art. Astigmatic sensors are used in some embodiments of the invention because of their relative immunity to construction tolerance errors.

Focus sensors produce an output signal, called an s-curve, because of its general shape around the ideal focus point, whose signal value represents a distance of the lens of the head 101 from the ideal focus point. The ideal focus point is a distance above the disk surface 106. Therefore, the focus sensor output signal inherently represents the distance of the lens of the head 101 above the disk surface 106. The focus sensor output signal may be calibrated in a simple manner, for example, by measuring the focus sensor output signal value at a flying height of zero, i.e., when the disk is not spinning and the head is resting on the surface 106. The gain of the focus sensor is a substantially constant value known from the design of the sensor and relatively insensitive to construction tolerances. Therefore, the flying height can easily be computed by those skilled in the art, knowing the signal value at a flying height of zero, the signal value at the current unknown flying height and the gain of the focus sensor.

Although the focus sensor is used in one embodiment of the invention because it is already included in some disk drive systems, it should be understood that the invention is not limited to this type of sensor. Any sensor that is capable of producing a signal representative of flying height can be used in accordance with the present invention.

Figure 8:
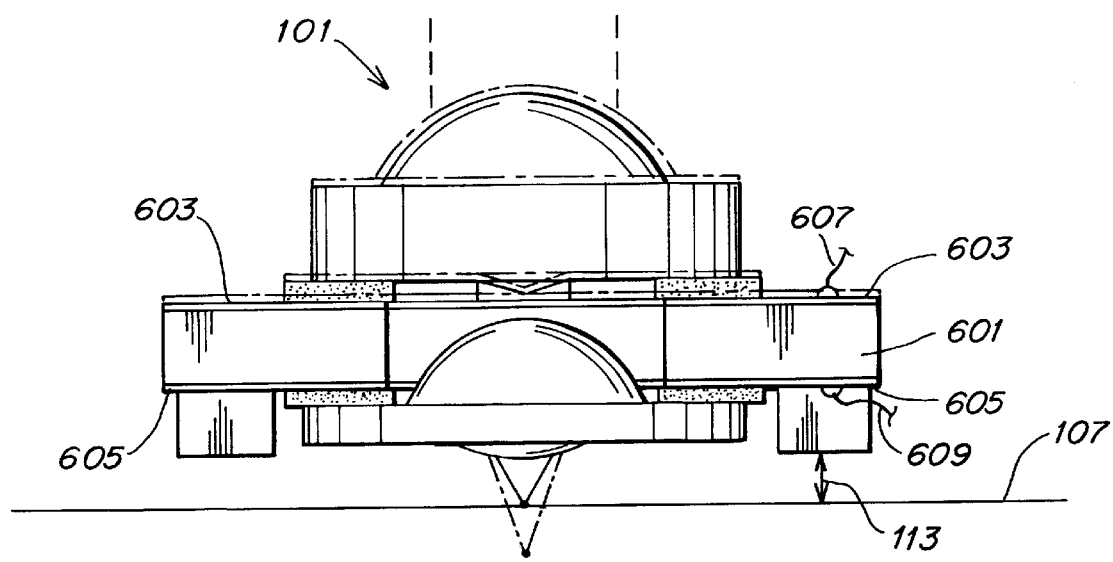
FIG. 8 is an end elevation view of an alternate embodiment of the invention directed to a head including a flying height sensor.

In another embodiment described in connection with FIG. 8, a piezoelectric transducer is integrated into the head to provide signals 112 indicative of flying height 113. In this embodiment, the body 601 of the head 101 is formed of a piezoelectric ceramic material, such as PZT, and includes electrodes 603 and 605 formed thereon. Although two are shown, more can be used. Connections 607 and 609 made to the electrodes 603 and 605 carry a signal representative of stresses under which the body of the head 101 is placed. For example, if the head 101 were to fly too close to the surface of the disk 107, at some point striking the surface of the disk 106, then the head 101 will "ring" or vibrate at some natural frequency dependent upon the mass of head 101 and the characteristics of the air bearing and suspension. A signal is generated across electrodes 603 and 605 at the natural frequency at which the head 101 rings. The amplitude of such a signal indicating contact between the head 101 and the disk surface 106 may be used as an indicator of head flying height 113 by the controller 111 because more frequent contact between the head 101 and the disk surface 106 causes the ringing to be reinforced, resulting in a larger signal amplitude. When the frequency of such contacts as indicated by the amplitude of the signal at the natural frequency is too high, then the control signal 114 to the actuator 109 is adjusted to reduce the force $F_L$, thereby increasing the flying height of the head. A flying height that is too high is indicated, for example, by observing an inadequate read signal amplitude, or using a focus error signal in an optical system as described above. In other embodiments, flying height may be determined solely by using other proximity sensors known in the art, such as a capacitive sensor, a magnetic sensor or an independent optical sensor. Such proximity sensors are known in the art.

In another embodiment, a contact sensor such as the piezoelectric sensor described above can be used in connection with circuits or software which simply counts a number of contacts between the head 101 and the disk surface 106. A high frequency of contacts indicates too low a flying height, i.e., below the minimum glide height.

The embodiments of the invention described so far differ from conventional systems in that a number of tolerances do not affect flying height in these embodiments that do affect flying height in conventional systems. Conventional systems, even those which exercise some dynamic control over flying height, do not drive flying height to equal the minimum glide height because mechanical tolerances and environmental variations that are not compensated for by the dynamic control mechanism could cause such conventional systems to occasionally operate at flying heights less than minimum glide height, resulting in a catastrophic system failure. In contrast, embodiments of the invention determine minimum glide height by detecting contact with surface asperities while controlling flying height, thus ensuring that each unit produced in accordance with the principles of the invention can fly the head at the minimum glide height.

Figure 9:
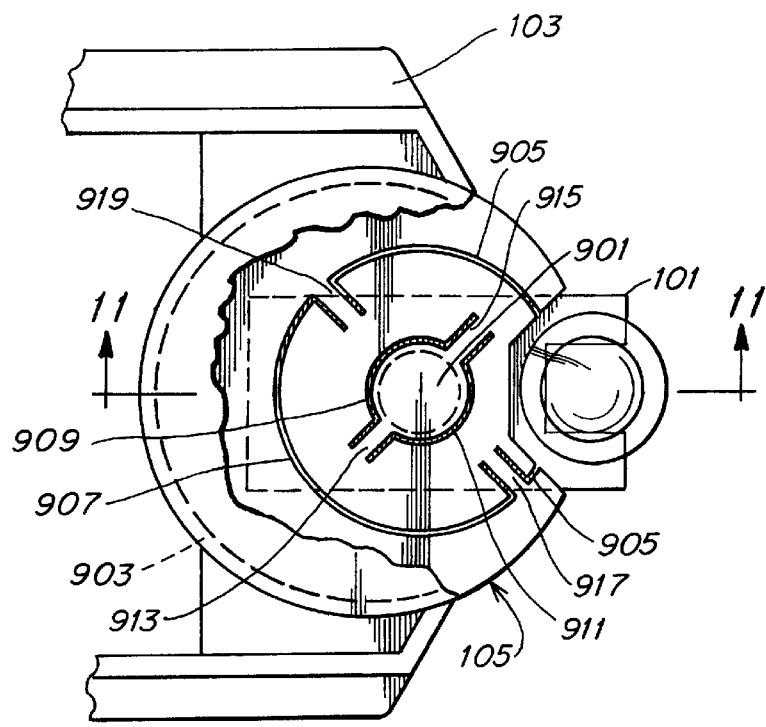
FIG. 9 is a detail view of the head suspension of FIGS. 2–6 taken along 9—9 of FIG. 6 showing a gimbal.
Figure 10:
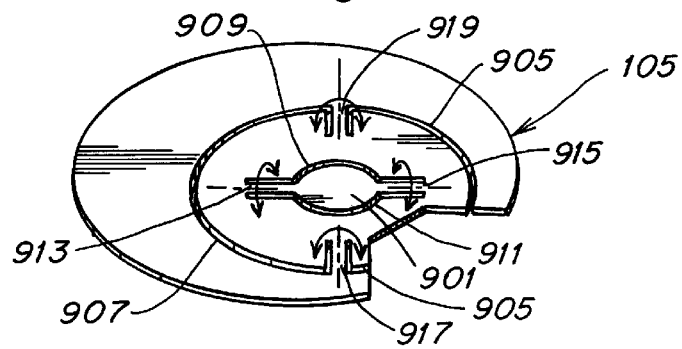
FIG. 10 is a detail of the gimbal of FIG. 9.
Figure 11:
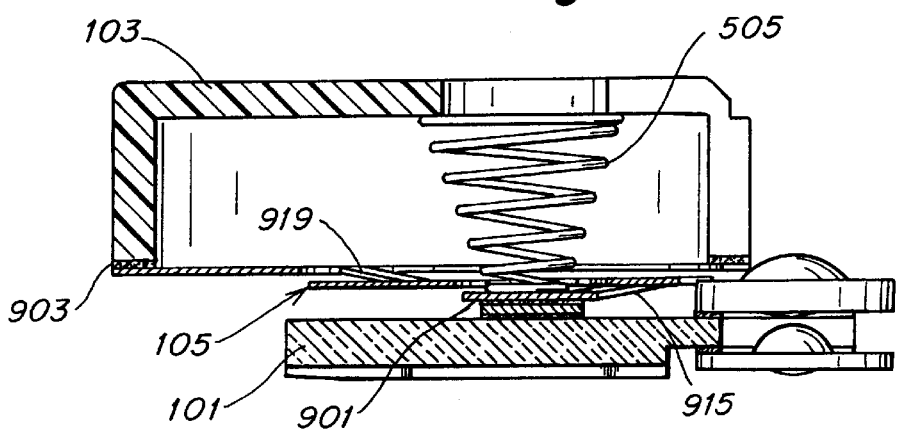
FIG. 11 is a cross-sectional side view of a detail of one embodiment of the head suspension taken along line 11—11 of FIG. 9.
Figure 12:
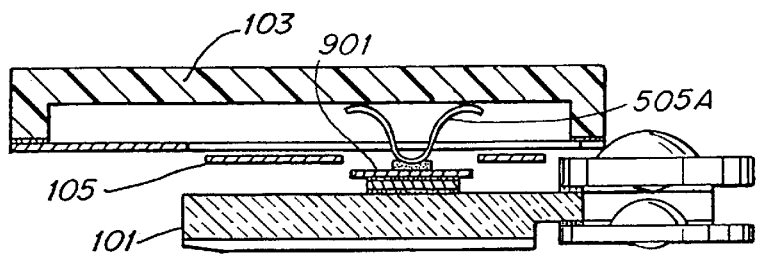
FIG. 12 is a cross-sectional side view of a detail of an alternate embodiment of the head suspension of FIG. 9.
Figure 13:
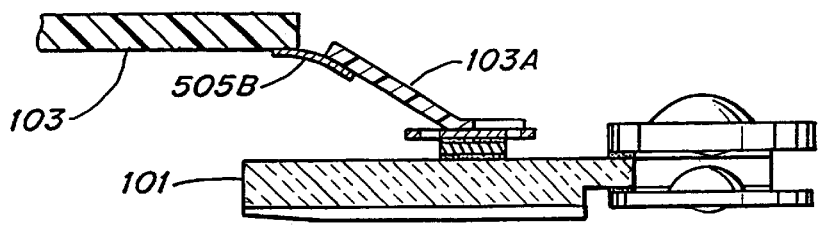
FIG. 13 is a cross-sectional side view of a detail of a head suspension which may be used in place of that of FIG. 9.
Figure 14:
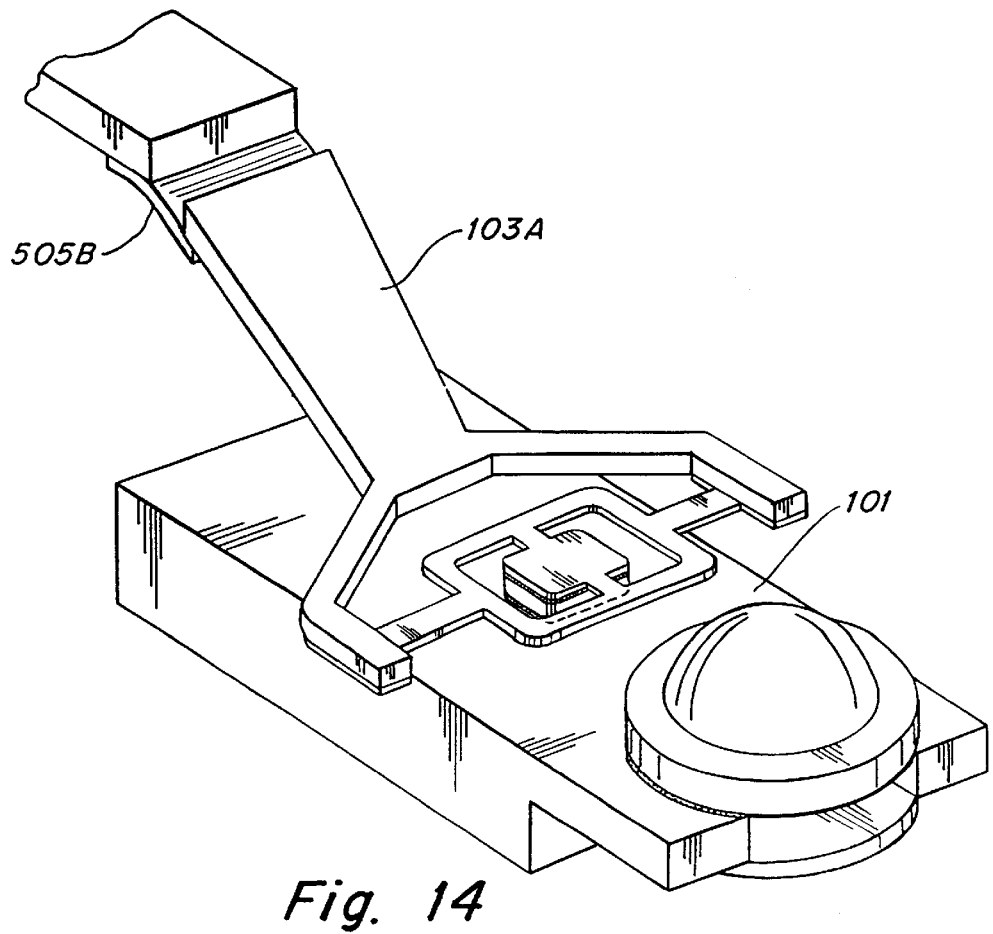
FIG. 14 is a perspective view of the detail of FIG. 13.
Figure 15:
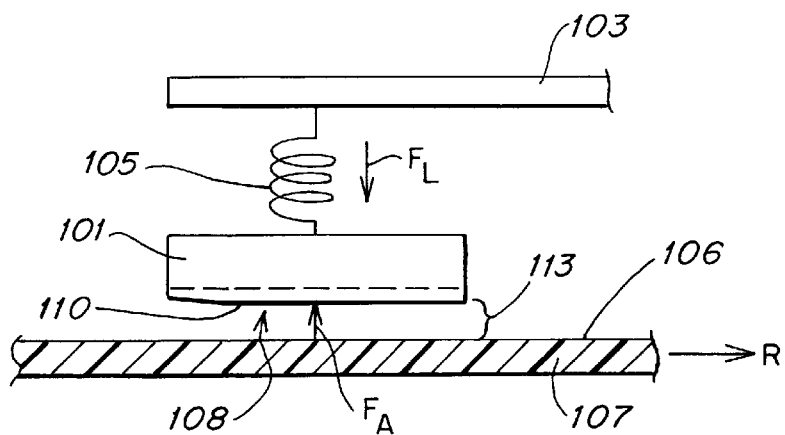
FIG. 15 is a schematic side elevation of a conventional flying head mechanism.
Figure 16:
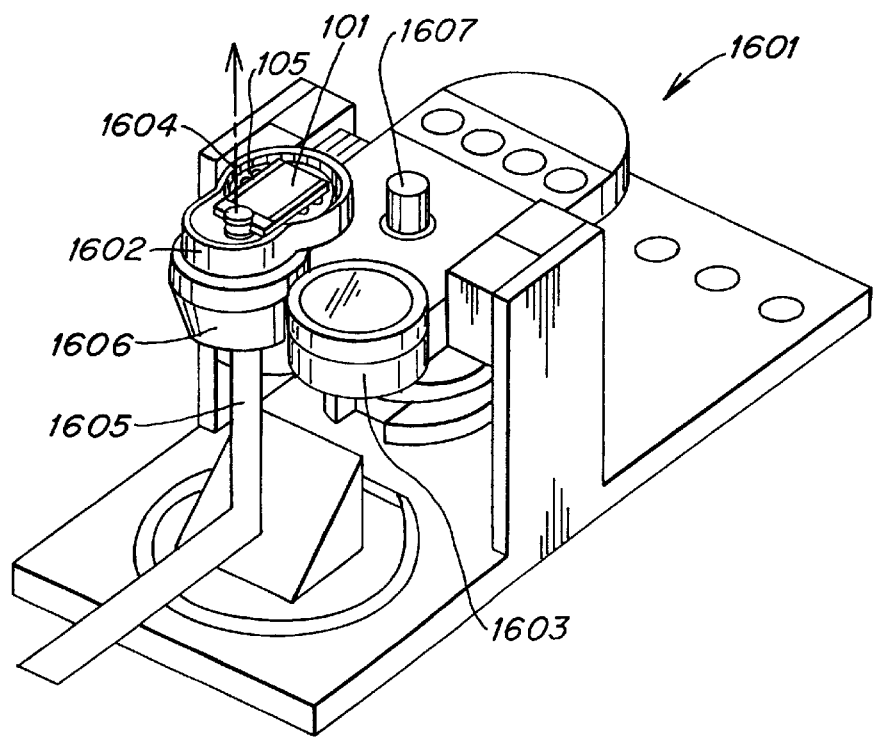
FIG. 16 is a perspective view of a pivoting head carriage assembly.

Example gimbal structures for implementing resilient member 105, along with related structures, are now briefly discussed in connection with FIGS. 9–14. One embodiment is shown in FIGS. 9–10; a variation on that embodiment is shown in FIG. 11; a second variation is shown in FIG. 12; and another embodiment is shown in FIGS. 13–14. Any of these embodiments of a resilient member 105 may be used in connection with the present invention.

In the embodiment shown in FIGS. 9–10, a flying head 101 is connected to load arm 103 through gimbal 105. Although an optical head is shown, any flying head may be used in connection with this structure. Slots 905, 907, 909 and 911 are etched into gimbal 105 to permit the gimbal to flex at a lower spring rate in some directions than in others. Yaw and radial motion is substantially inhibited by the substantial cross-sections of gimbal material through which such motion must be transmitted, while motion in the roll and pitch directions is very readily permitted by hinge regions 913, 915, 917 and 919, which act as torsion springs. The gimbal 105 can be, for example, a precision etched thin piece of stainless steel. The head 101 can be attached by applying epoxy to the gimbal 105 in region 901, which is in turn attached to load arm 103 by a quantity of epoxy in region 903. Other adhesives and attachment methods are also suitable, such as high strength glues, interference fits between parts and various clamping arrangements.

In alternate embodiments of the invention, the gimballed assembly of FIGS. 9–10 may further include a spring disposed in a position to exert additional downward force, as now described in connection with FIGS. 11–14. FIG. 11 shows an embodiment using a coil spring to exert force at region 901 of the gimbal 105, while FIG. 12 shows an embodiment using a leaf spring to exert force at region 901 of the gimbal 105. FIGS. 13 and 14 show an embodiment in which a leaf spring exerts force on the gimbal 105 through an auxiliary arm.

As seen in FIG. 11, the gimbal 105 has considerable flexibility in a purely vertical direction. In the embodiment shown, an additional optional spring 505 is disposed between region 901 of the gimbal 105 and the load arm 103, to increase the spring rate in the vertical direction without appreciably affecting the spring rate in the roll and pitch directions. In FIG. 11, spring 505 is a coil spring. However, the invention is not limited to using any particular type of spring, as many other types of springs can be used, such as a leaf spring 505A as shown in FIG. 12. These arrangements should suggest numerous others to the skilled artisan, which can be used in embodiments of the invention without departing from the inventive concept.

In yet another alternate embodiment shown in FIGS. 13 and 14, load arm 103 is connected through a leaf spring 505B to an auxiliary arm 103A. Head 101 and auxiliary arm 103A are then connected through the gimbal 105 described in connection with FIGS. 9–10.

One advantage of the present invention, as can be observed from the above detailed description of illustrative embodiments thereof, is that setting and maintaining a proper load force does not require the use of a special jig, removing a disk drive from service or any other action which impairs the useful operation of the unit. The setting of load force may be made and varied during normal drive operation. Load force may be substantially continuously updated to follow changing conditions and maintain an optimum flying height as close to the disk surface as possible without coming into contact with the disk surface, i.e., at the minimum glide height.

Performance of some embodiments of the invention is further enhanced by generating and storing in the controller (FIG. 1, 111) a map of the vertical runout of the disk surface which the head should follow. The map may be applied as an input to the controller (FIG. 1, 111) to provide a bias to the control signal (FIG. 1, 114). As will be understood by those familiar with feedback control systems, this reduces the amount of error in flying height (FIG. 1, 113), as represented by the flying height signal (FIG. 1, 112), that must be compensated for by adjusting the control signal (FIG. 1, 114). Generation of the map may take place at the time of manufacture or may be performed periodically during periods of non-use of the disk drive. In the latter instance, a special head carriage is used, as now described in connection with FIGS. 16–19.

The head carriage 1601 of this embodiment incorporates the flying head 101 and suspension 105 features already described above. For brevity, that description is not repeated, here. An actuator (not shown) raises and lowers the head carriage 1601 along a shaft 1607 in the same manner and under the same form of control as described above in connection with actuator 109.

The head 101 and suspension 105 are epoxied, glued or otherwise fixedly attached to an adapter ring 1602. The adapter ring 1602 has a spherical base which fits into a circular or spherical socket 1606 in the head carriage 1601. The adapter ring can thus rock, swivel or rotate to a small degree, permitting the axis 1604 of the head to be aligned with the axis of the laser beam 1605. After alignment, the adapter ring of this embodiment is fixedly attached to the head carriage 1601 using glue, epoxy, fasteners or other known techniques. Optionally, the attachment may be made using a friction fit or other releasable means, so that alignment can be readjusted outside of the manufacturing environment.

In addition, the head carriage 1601 includes a fixed, non-contact, non-flying lens element 1603, such as a conventional compact disk lens. The head carriage 1601 of this embodiment pivots between two substantially fixed positions shown in FIG. 17 and FIG. 19, respectively, as now described.

Figures 17, 18, 19:
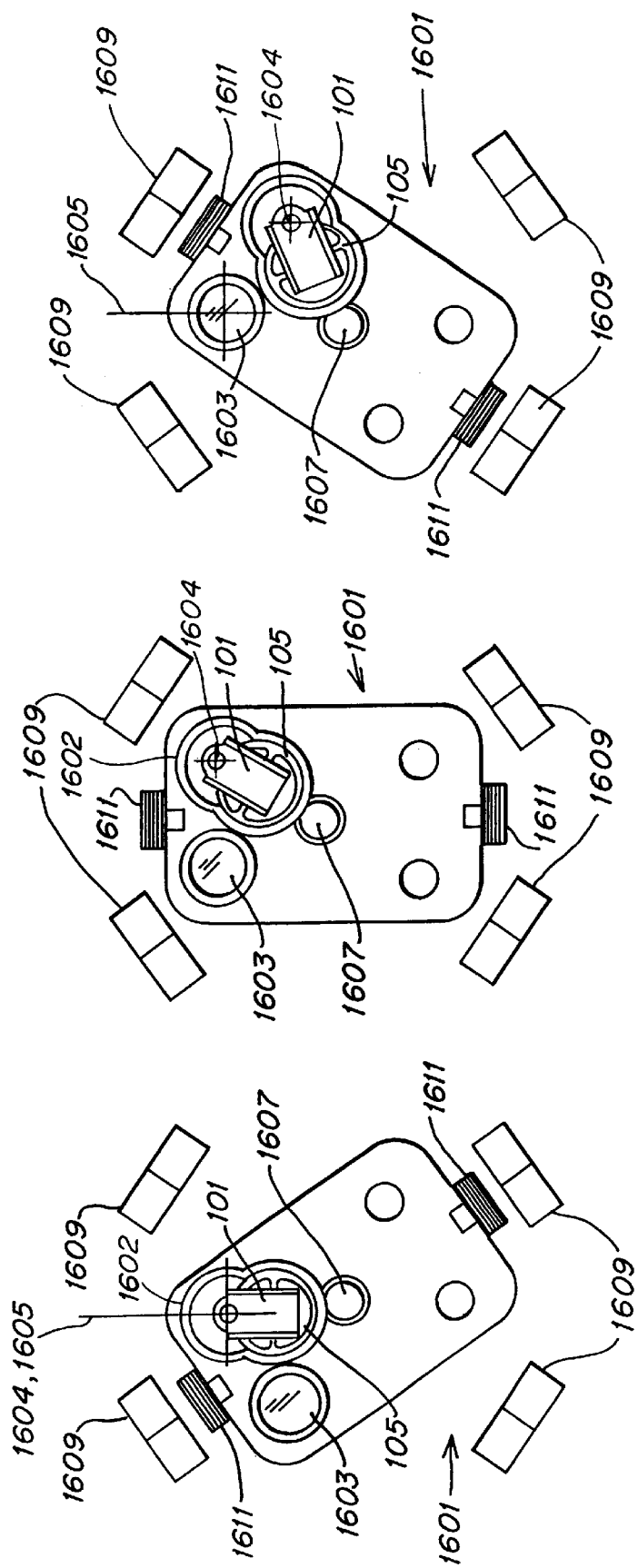
FIGS. 17, 18 and 19 are plan views of the pivoting head carriage assembly of FIG. 16, shown in three different positions.

In a first position, shown in FIG. 17, the head 101 is positioned for flying over and accessing the recording medium. Magnetic, magneto-optic, optical and other types of flying heads may be used, without limiting the scope of the invention. In the case of an optical head, the first position locates the head 101 in alignment with a laser light source (FIG. 3, 301) as described previously. The beam from the laser light source is directed along axis 1605.

In a second position shown in FIG. 19, the fixed lens element 1603 is positioned in alignment with the axis along which the laser light beam is directed. A conventional focus sensor of any suitable type, including those previously described, detects a reflection of the beam from the disk surface and produces a time-varying focus signal which varies with the vertical runout of the disk during rotation thereof. A processor included in the controller (FIG. 1, 111) receives the time-varying focus signal, processes the time-varying focus signal and stores the result as a map of vertical runout of the disk. As a result of processing, the map may comprise a signal based upon one or more measured revolutions of the disk which may or may not have been filtered. Appropriate processing useful for achieving any desired sensitivity and resolution of the map is known.

After storing the map, the head carriage 1601 is pivoted (FIG. 18) from the second position to the first position, in which the head is flown over the medium surface in accordance with the discussion of FIGS. 1–14 to read data, in the normal manner. The head carriage 1601 is rotatably mounted on a shaft 1607. Magnets 1609 and coils 1611 cause the head carriage 1601 to pivot in a manner similar to a two position stepping motor.

The controller (FIG. 1, 111) accesses a map signal representing the stored map, and reads the map back in synchronism with the rotation of the disk. The controller (FIG. 1, 111) applies the map signal as a biasing signal, whereby the control signal (FIG. 1, 114) is preset to a value which compensates for the known vertical runout as represented by the map. In a feedback control system, use of a biasing technique reduces the stress placed on the system, enabling the system to perform with greater speed and resolution, as previously mentioned.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto and equivalents thereof.

What is claimed is:

1. A flying head mechanism having a controllable load force, for flying an optical head at a flying height between a minimum glide height which is just greater than a height of asperities on a recording medium and a height at which evanescent wave coupling at a wavelength of interest occurs, the mechanism comprising:
   a suspension;
   an optical head having an air bearing surface and a solid inmersion lens (SIL), the head being mounted by the suspension such that relative motion between a surface of the recording medium and the air bearing surface will cause an air bearing to develop therebetween;
   a force actuator, connected to the suspension, to apply an adjustable load force to the head through the suspension in opposition to a separating force generated by the air bearing, the force actuator having a control input to receive a control signal and being responsive to the control signal to adjust the load force; and
   a controller having a control output, connected to the control input of the force actuator, that carries the control signal, the controller generating the control signal, to cause the actuator to produce a load force which acts to substantially maintain the head at the flying height between the minimum glide height just greater than the height of asperities above the surface of the recording medium and the height at which evanescent wave coupling at the wavelength of interest occurs.

2. The flying head mechanism of claim 1, wherein the control signal is an electrical current and wherein the force actuator includes a voice coil that is coupled to the control input and responsive to the control signal.

3. The flying head mechanism of claim 1, wherein the controller includes a sensor which has an output indicative of when the head flies at a height less than the minimum glide height.

4. The flying head mechanism of claim 3, wherein the sensor detects contacts between the head and the surface of the recording medium.

5. The flying head mechanism of claim 4, wherein the sensor produces as the sensor signal a signal representing an amplitude of a natural frequency of vibration of the head induced by contact between the head and the medium.

6. The flying head mechanism of claim 5, wherein the flying height sensor includes a piezoelectric transducer positioned to detect vibration of the head.

7. The flying head mechanism of claim 5, wherein the flying height sensor includes a piezoelectric transducer positioned to detect vibration of the head, wherein the flying height sensor is integrated with the head.

8. The flying head mechanism of claim 5, wherein the sensor is an optical transducer which detects modulation of an optical signal at the natural frequency.

9. The flying head mechanism of claim 8, wherein the optical transducer reproduces information from the recording medium and includes:
   a detector having an output, connected to the flying height sensor output, that provides a signal representing a degree of focus of a light spot projected onto the medium surface by the head.

10. The flying head mechanism of claim 1, wherein the suspension comprises:
    a gimbal that mounts the head and has a lower spring rate in roll and pitch directions than in vertical, yaw and seek directions.

11. The flying head mechanism of claim 10, wherein the suspension further comprises:
    a load arm supporting the gimbal; and
    a resilient member disposed between the load arm and a region of the gimbal connected to the head.

12. The flying head mechanism of claim 10, wherein the suspension further comprises:
    a load arm;
    an auxiliary load arm to which the gimbal is mounted; and
    a spring connecting the load arm and the auxiliary load arm.

13. The flying head mechanism of claim 3, wherein the controller further comprises:
    a memory, in which a map of vertical runout measured by the sensor can be stored; and
    a bias generator that biases the force actuator according to the map stored in the memory.

14. A flying head mechanism having a controllable load force, for flying an optical head at a flying height between a minimum glide height which is just greater than a height of asperities on a recording medium and a height at which evanescent wave coupling at a wavelength of interest occurs, the mechanism comprising:
    a head having a solid inmersion lens (SIL) and further having an air bearing surface oriented relative to a surface of the recording medium such that relative motion between the air bearing surface and the recording medium surface causes an air bearing to develop therebetween; and
    a load force controller, coupled to the head, to apply a load force in opposition to a separating force generated on the head by the air bearing, the load force controller including a sensor to measure a flying height and minimum glide height of the head, the load force controller being configured to vary the load force to maintain a constant separation between the air bearing surface and the recording medium surface greater than the minimum glide height just greater than the height of asperities on the recording medium surface and less than the height at which evanescent wave coupling at the wavelength of interest occurs.

15. The flying head mechanism of claim 14, wherein the sensor includes means for detecting a frequency of contact between the air bearing surface and the recording medium, and wherein the minimum glide height is represented by a substantially zero frequency of contact.

16. The flying head mechanism of claim 15, wherein the sensor is a piezoelectric transducer having an output which represents flying heights less than the minimum glide height by an amplitude of a natural frequency of vibration of the head detected by the piezoelectric transducer.

17. The flying head mechanism of claim 15, wherein the means for detecting a frequency of contact is an optical transducer which detects modulation of an optical signal at a natural frequency of vibration of the head.

18. The flying head mechanism of claim 17, wherein the optical transducer reproduces information from the recording medium and includes:
a detector having an output carrying a signal representing a degree of focus of a light spot projected onto the medium surface by the head.

19. The flying head mechanism of claim 14, further comprising:
a controller having an input connected to an output of the sensor to receive a signal representative of a flying height relative to the minimum glide height, the controller having an output in communication with a control input of an actuator, the output carrying a control signal derived from a characteristic of the signal representative of the separation between the air bearing surface and the recording medium surface;
wherein the head includes said lens arranged to focus a laser beam onto the recording medium, and wherein the sensor also includes means for receiving through the lens an optical signal carrying recorded information from the recording medium and means for transducing the optical signal into an electrical signal.

20. The flying head mechanism of claim 19, wherein the sensor further comprises a focus detector in a path of the laser beam that produces focus information of the laser beam on the recording medium, and wherein the controller derives the control signal from the focus information.

21. The method of claim 14, the load force controller receiving from the sensor vertical runout measurements, the load force controller further comprising:
a memory in which a map of vertical runout can be stored; and
a bias generator that biases the load force according to the map stored in the memory.

22. A method of controlling a load force applied to a flying optical head while using the flying optical head to reproduce information recorded on a recording medium, the method comprising steps of:
measuring a flying height of the head above an information track of the recording medium;
determining whether the measured flying height is less than or equal to a minimum glide height just greater than a height of asperities on the recording medium;
adjusting the load force applied to the head when the measured flying height is found less than or equal to the minimum glide height in the step of determining; and
simultaneously with the foregoing steps, reproducing information recorded on the recording medium using a solid inmersion lens (SIL) carried by the flying optical head to evanescently couple an optical signal into the recording medium.

23. The method of claim 22, wherein the step of measuring further comprises steps of:
projecting a laser beam through said lens on the head onto the recording medium;
detecting focus of the projected laser beam; and
computing the measured flying height from the detected focus.

24. The method of claim 23, further comprising a step of:
extracting from the detected focus an amplitude of a variation in focus occurring at a resonant frequency of vibration of the head; and
wherein the step of computing includes computing the measured flying height from the amplitude extracted from the detected focus.

25. The method of claim 22, further comprising:
measuring vertical runout of the recording medium;
storing a map of vertical runout of the recording medium; and
providing a bias to the step of adjusting load force, the bias corresponding to the stored map.

26. A method of loading a flying optical head on a medium, comprising steps of:
applying a load force to the head; and
dynamically varying the load force by means of a controller in response to varying operating conditions to maintain a substantially constant flying height greater than a minimum glide height just greater than a height of asperities on the medium and less than a height at which evanescent wave coupling by a solid inmersion lens (SIL) carried by the head at a wavelength of interest occurs while the head retrieves information from the medium by evanescently coupling an optical signal into the medium.

27. The method of claim 26, further comprising a step of:
measuring a flying height of the head relative to the minimum glide height; and wherein the step of varying the load force is performed responsive to the step of measuring.

28. The method of claim 26, further comprising a step of:
generating a signal representative of contacts between the head and the medium indicative of a flying height less than the minimum glide height.

29. A flying head mechanism comprising:
a flying optical head carrying a solid inmersion lens (SIL);
a sensor that detects a flying height of the head relative to a minimum glide height just greater than a height of asperities on a medium; and
means for applying a load force to the head that varies in accordance with the detected flying height to maintain the flying height of the flying head greater than the minimum glide height just greater than the height of asperities on the medium and less than a height at which evanescent wave coupling at a wavelength of interest occurs.

30. The mechanism of claim 29, wherein the flying head is to be used in connection with a recording medium, and wherein the means for applying further comprises:

means mounted between head and means for applying, that permit movement of the head relative to the means for applying in response to vertical runout of the recording medium.

31. The mechanism of claim 29, wherein the sensor further comprises:

means for measuring an amplitude of a resonant frequency of vibration of the head indicative of contact between the head and a recording medium, the control output varying responsive to the means for measuring.

32. The mechanism of claim 29, further comprising:

a controller including a memory, the controller receiving vertical runout measurements of the recording medium from the sensor and storing a map thereof in the memory, and the controller further including a bias generator that biases the means for applying a load force according to the stored map.

* * * * *